United States Patent [19]

Helms

[11] 4,123,739
[45] Oct. 31, 1978

[54] THERMOSTAT CONTROL

[75] Inventor: Thomas F. Helms, Sherman, Conn.

[73] Assignee: Altek Company, Torrington, Conn.

[21] Appl. No.: 767,111

[22] Filed: Feb. 9, 1977

[51] Int. Cl.² ............................................. H01H 37/62
[52] U.S. Cl. ..................................... 337/301; 74/3.56;
    236/46 R; 337/302
[58] Field of Search ............... 337/301, 302, 303, 304,
    337/305, 3, 4, 51, 81, 341; 236/46 R; 74/3.56;
    200/38 A, 33; 165/12

[56]  References Cited
U.S. PATENT DOCUMENTS

| | | | |
|---|---|---|---|
| 1,606,599 | 11/1926 | Rayfield | 337/341 |
| 2,129,878 | 9/1938 | Sambur et al. | 337/302 |
| 3,774,407 | 11/1973 | Bright | 200/33 R |
| 4,002,292 | 1/1977 | Parks | 236/46 R |
| 4,014,499 | 3/1977 | Hamilton | 236/46 R |

*Primary Examiner*—Harold Broome
*Attorney, Agent, or Firm*—E. Seward Stevens

[57] ABSTRACT

A thermostat control to change the setting of a thermostat to a preselected point and automatically to return the thermostat to the original setting after elapse of a preselected time interval.

3 Claims, 5 Drawing Figures

THERMOSTAT CONTROL

The object of my invention is to produce a structure for turning a thermostat to a lower (or higher in the case of air conditioning) temperature setting for a period of time when heat or cooling level may be changed in order to conserve energy and restoring the original setting to return the system to a "normal" level of comfort after that period is over.

A further object is to provide a structure which permits easy preselection of high and low settings of the thermostat or the degree of change thereof.

A further object is to provide a structure with the character described wherein the motive power may be a small motor, electric or spring, which structure may be arranged to provide a fixed preselected time interval or a variable preselected time interval.

A further object is to provide a structure of the character described in which the above and other objects may effectively be attained.

A practical embodiment of my invention is shown in the accompanying drawing in which FIG. 1 represents a top plan view of a conventional thermostat to which my invention is attached.

Figure 1:
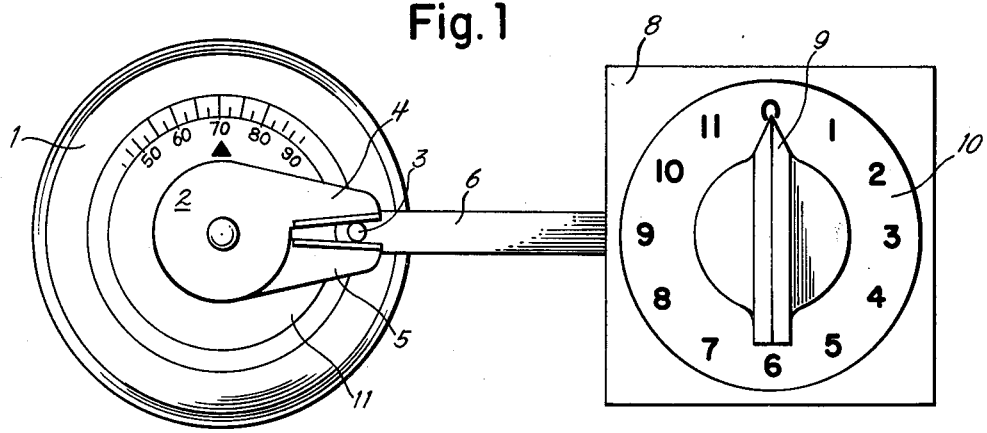

Referring to the accompanying drawing in which the respective parts bear the same numerals in each view, FIG. 1 shows a typical residential thermostat shown for reference as 1. It is shown in a normal residential setting position of 70°. An adjustable cam assembly 2 has been affixed to the moveable dial 11 of the thermostat 1 by pressure sensitive adhesive or any other convenient means. A drive pin 3 extending from an actuating arm 6 is captive between actuating cams 4 and 5. A timing mechanism affixed to the wall is shown for reference as 8. It is depicted in the zero position in which condition the actuating arm 6 bearing pin 3 is in its "normal" position and the motor, whether electric, spring or otherwise powered, is inactive. Timing mechanism 8 is depicted as offering a variable interval, but may also be of the fixed duration type if desired.

Figure 2:
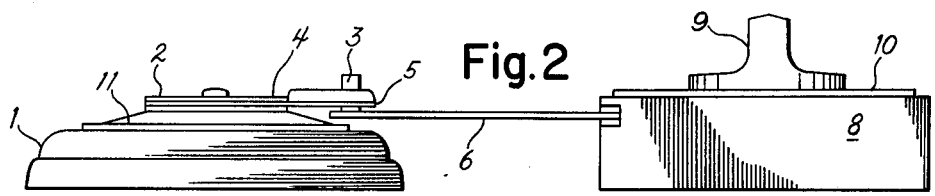
FIG. 2 represents in side elevation the embodiment shown in FIG. 1.

Referring to FIG. 2, pin 3 is carried upwardly extending from arm 6 and is interposed between but not connected to cams 4 and 5.

Figure 3:
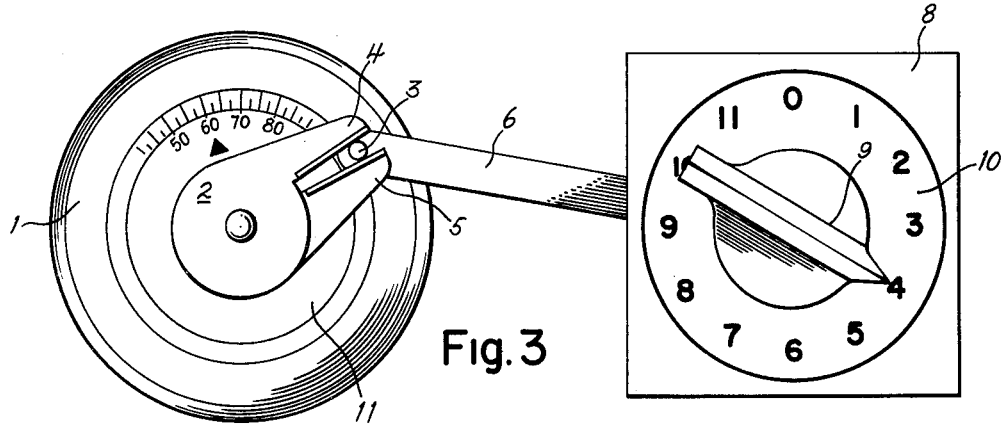
FIG. 3 represents a top plan view of the embodiment shown in FIG. 1 showing the position of the respective parts preset to a time interval of 4 hours.

Referring to FIG. 3 the setting knob 9 has been turned clockwise from zero and in this variable interval version has been set for 4 hours as shown on scale 10. The actuating arm 6 at the same time has been moved upward by the timing mechanism carrying with it, by means of the engagement of pin 3 with low limit cam 4, cam assembly 2 which moves dial 11 counterclockwise altering the setting of thermostat 1 to a lower setting shown here as 60°. Here it will remain until timing mechanism 8 completes its 4 hour cycle and returns to zero at which time actuating arm 6 and its pin 3 will be moved back to the original position as shown in FIG. 1 and the thermostat will be reset by high limit actuating cam 5 to 70° also as shown in FIG. 1. The exact positions of cams 4 and 5 can be varied to provide a variety of high and low settings.

Figure 4:
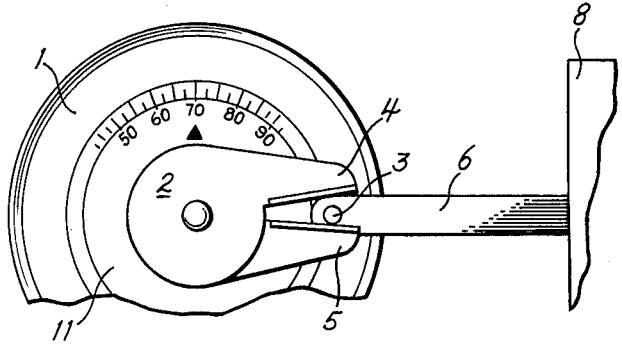
FIG. 4 represents the structure shown in FIGS. 1, 2 and 3 in top plan view, showing an adjusted position of the low limit cam to control the number of degrees to which the thermostat setting is reduced.

Referring to FIG. 4, this shows the design as depicted in FIGS. 1, 2 and 3 but low limit cam 4 has been displaced counterclockwise from high limit cam 5. Any motion of actuating arm 6 will not move cam assembly 2 until pin 3 contacts low limit cam 4. Thus, the same travel of arm 6 will produce less counterclockwise motion of cam assembly 2 and dial 11. This will have the effect of reducing the number of degrees to which the thermostat setting is reduced. Similarly, the position of high limit cam 5 can be changed to alter the high position on the thermostat to that desired. By proper adjustment of cams 4 and 5 the thermostat can be turned up and down between any two reasonable set points by the same travel of arm 6 carrying pin 3.

Figure 5:
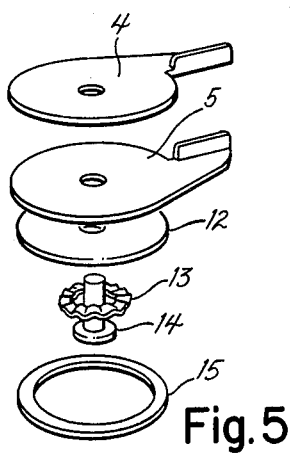
FIG. 5 represents a vertically exploded view of one embodiment of a suitable cam assembly including wave spring and rivet.

Referring to FIG. 5, this shows one possible structure of cam assembly 2 in exploded view. Cams 4 and 5 are coaxially and rotatably mounted to subplate 12 by means of rivet 14. A wave spring 13 is interposed between the head of rivet 14 and subplate 12 to provide a constant axial load and suitable friction between cams 4 and 5 and subplate 12 so that the force necessary to displace cams 4 and 5 relative to subplate 12 will be substantially greater than the force necessary to rotate dial 11. This ensures that motion of pin 3 carried by arm 6 will be translated into motion of dial 11 resetting the thermostat rather than motion of cams 4 and 5 changing the high or low limit. Subplate 12 in this version carries a ring of doublesided pressure sensitive adhesive 15 by means of which its attachment to dial 11 can be made.

This is but one of the possible embodiments of my invention. It will be obvious to anyone skilled in the art that many other combinations are possible within the scope of this invention, therefore I do not intend to be limited to the specification embodiment herein shown and described except as it may be limited by the appended claims.

I claim:

1. A thermostat control comprising an attachment for a thermostat having a rotary setting dial,
    an adjustable cam assembly affixed to said dial,
    a timing mechanism located adjacent the thermostat,
    an arm carried by and actuated by said timing mechanism,
    a pin mounted on said arm and engaged with said cam assembly
    whereby motion of the timing mechanism arm actuates the pin and the engaged cam assembly for setting and resetting the thermostat dial.

2. A structure according to claim 1 in which the timing mechanism is of the variable interval type.

3. A structure according to claim 1 in which said adjustable cam assembly comprises a plurality of superposed independently adjustable arms for engagement by said pin.

* * * * *